United States Patent Office 3,372,007
Patented Mar. 5, 1968

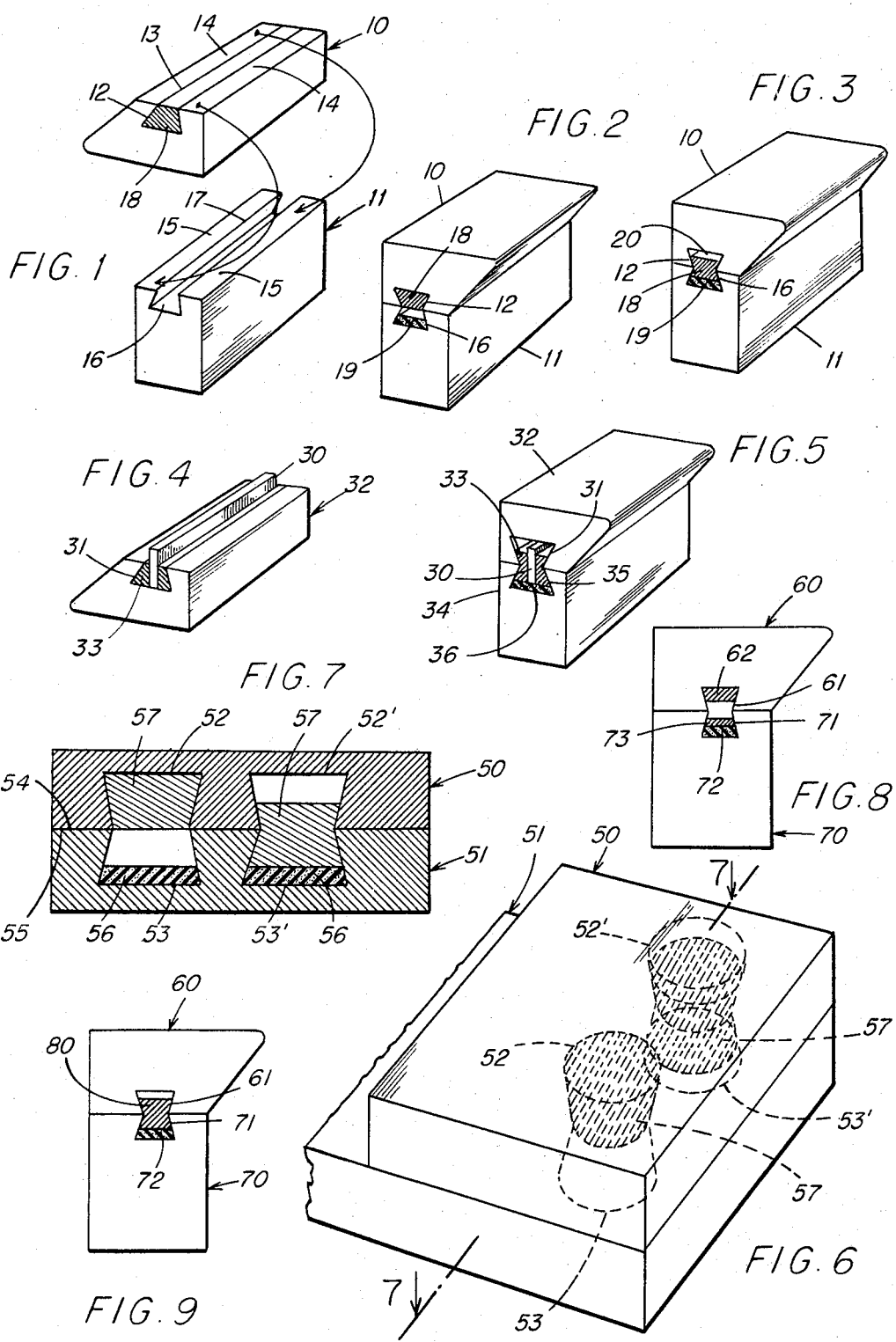

3,372,007
WORKPIECE ASSEMBLY
James D. Shaver, Scarsdale, N.Y., assignor to Clark & Vicario Corporation, North Tarrytown, N.Y., a corporation of New York
Filed Aug. 3, 1965, Ser. No. 476,953
5 Claims. (Cl. 29—183)

This invention relates to the fastening together of two bodies. It is more particularly concerned with a method for connecting together two bodies or workpieces in a manner wherein no obtrusive fastener devices are employed or project outwardly of the bodies.

It is required at times to be able to connect two bodies together in a manner such that the connector or fastening means employed is not exposed at or protruding outwardly of any exterior surface of either body. For example, paper processing may involve feeding a continuous wet sheet of paper stock over and around the periphery of a machine element constituting a support or a water removal device which to avoid having a damaging effect on the wet sheet, must have a contiguous smooth outer surface. The machine element may be a type which requires periodic replacement and its physical positioning may dictate that it be removably connected to another element such as a frame member to facilitate accessibility for removal. Furthermore, it is common practice to use in paper making machinery, workpieces of very hard materials to resist wear and reduce friction. The hardness of the material makes it difficult and expensive to drill and tap holes or perform various other machining operations for securing the parts together with prior art fastening means. Of additional importance in paper making processes is the requirement that the working parts have no external recesses or pockets for receiving the fastening elements because these recesses can constitute pickup points for paper slime buildup or accumulation of other residue which can have a deleterious effect on the finished product.

It is therefore an object of the present invention to provide a method for fastening or securing together two bodies without exposing the fastener means.

Another object is to provide a method for connecting two bodies together which allows disassembly of the mating parts without causing damage thereto and which may be effected in a quick, simple manner by heating the bodies. Other objects of the invention will in part be obvious and will in part appear hereinafter.

The invention accordingly comprises the several steps and the relation of one or more of such steps with respect to each of the others, thereof, and the article possessing the features, properties, and the relation of elements, which are exemplified in the following detailed disclosure, and the scope of the invention will be indicated in the claims.

The present invention is suited for connecting together two bodies which may be made of a variety of materials, the bodies being of the same or dissimilar materials. As a first step, a cavity is formed in each of the bodies opening inwardly of the intended mating surfaces. Formation of the cavities of course is unnecessary if the bodies are manufactured with cavities suitable for the intended purposes. The cavities preferably are made so as to have mouth openings of similar shape and dimension and are so formed that they each become increasingly enlarged inwardly of the mouth openings. As the next step, one of the cavities is filled with molten metal alloy having a low melting temperature and which upon cooling does not shrink. The cavity in the second body may then be partly filled at its inner reaches with a compressible material to diminish the volume thereof. The bodies are thereafter held in adjacent or juxtaposed mating contact with respective mouth openings in register. Heat is then applied to the bodies being transmitted to the metal alloy in the first cavity so as to cause the alloy to remelt and flow into the second cavity with a portion thereof remaining in the first. When the alloy thereafter solidifies it will firmly hold the two bodies together.

The invention will appear more clearly from the following detailed description when taken in conjunction with the accompanying drawings in which:

FIGURE 1 is a perspective view of two bodies or workpieces which may be connected together according to the method of the present invention, the upper body being shown inverted from its normal working position.

FIGURE 2 is a perspective illustration of the bodies shown in FIGURE 1 held in the intended mating contact preparatory to remelting the metal alloy which connects the bodies.

FIGURE 3 shows the same parts illustrated in FIGURE 2, but depicting the bodies and connecting mass after the bodies have been firmly connected to each other by remelting the alloy and permitting it to invest both cavities in the respective bodies.

FIGURE 4 is a perspective view similar to the upper body shown in FIGURE 1 and in which is supported a shear member for strengthening the joint when the body is connected to another.

FIGURE 5 is a view similar to FIGURE 3 showing an assembly of two bodies connected together utilizing a shear member of the type illustrated in FIGURE 4.

FIGURE 6 shows another form of connection of two bodies wherein the cavities in the bodies are blind in two directions.

FIGURE 7 is a sectional view taken along the line 7—7 in FIGURE 6.

FIGURE 8 is an elevational view showing an assembly of two bodies wherein the cavity in each is partly filled with metal alloy, the bodies being shown in condition prior to remelting the alloy to form the joint.

FIGURE 9 is the same as FIGURE 8 after the alloy has been remelted in each cavity and coalesces to form a single mass.

Throughout the description, like reference numerals are used to denote like parts in the drawings.

The present invention is intended to provide a method for fastening together two bodies, preferably two workpieces comprising a working assembly, the bodies having relatively high melting points and which are substantially free of deleterious chemical change below certain critical temperature values. However, it is not essential that the bodies be working elements or form parts of a working assembly. The invention is equally intended for use in connecting together two ornamental or purely decorative members.

Referring now in detail to FIGURES 1-3 of the drawings, 10 and 11 denote two bodies which represent respectively a working element and its support and which are intended to be connected together by an unobtrusive fastening means. In other words, it is intended that the bodies have no fastener extending exteriorly of any surface thereon. Furthermore, it is preferable that the bodies have no recesses or openings such as counter sunk bolt holes communicating with any exterior surface. The bodies shown in these figures may be made of a wide range of materials including metal, Micarta, plastic, wood, glass, and various other materials used for structural or decorative purposes. The bodies 10, 11 are described by way of example only as being made of a ceramic material. As a first step, a cavity 12 is formed in the first body 10 being so formed that it has a mouth opening 13 lying in the plane of the external body surface 14 intended to mate with the corresponding surface 15 in the second body 11. The cavity may take various shapes such as the dovetail illustrated, "T" section, concave section, etc. Furthermore, it may extend from edge to edge on the body as shown or it may be blind in all directions except for the opening in the mating surfaces. The cavity 12, however, should have a wider or enlarged inner portion remote from the mouth opening so that the latter constitutes a shoulder means facing away from the mouth of the cavity to define therein an anchorage.

A cavity 16 is also formed in the second body 11 as illustrated. It may be of the same shape and dimensions as the cavity 12 in the first body 10 or there can be variations in both except that the mouth opening 17 therein should be similar in shape and dimension to that in the first body cavity and should have a shoulder means as described above. It will be readily apparent that formation of the cavities 12 and 16 in the respective bodies 10 and 11 is required only in the event the bodies are not normally formed or manufactured with suitable cavities therein. However, bodies, having "as manufactured" cavities should be checked to insure that the cavities answer to the requirements of the teaching herein. If necessary, the "as manufactured" cavities should be modified to fulfill the stated requirements.

Body 10 is preferably inverted as shown in FIGURE 1 and there is then introduced into its cavity 12 a mass of molten metal alloy 18 preferably in quantity sufficient to nearly completely fill the cavity, the end faces of the cavity being "dammed" with plates or other members until the alloy solidifies. Among the types of alloy which can be utilized is one commonly referred to as a "fusible non-shrinking alloy" and which is characterized by its having a relatively low melting temperature and the unusual property of being non-shrinking when changing from molten to solid state. In practice, the alloy should be one possessing the aforementioned properties and be compatible with the material of the bodies, that is to say, its melting temperature should be sufficiently low so as not to effect deleterious chemical or physical changes to the material of the bodies 10, 11 or cause adverse effect on the shapes of the cavities. Representative of suitable alloy types and one which is particularly suited for use with ceramic bodies, is the alloy known as Cerro alloy 5250-1 made by the Cerro de Pasco Corporation of New York. This alloy is comprised of bismuth, lead and tin in percentages of about 52.5%, 32.0%, 15.5%, respectively. It has a melting temperature of 203° F., and a tensile strength of 4070 lb./in.² A significant property of this alloy is that it does not shrink but instead undergoes an expansion when changing from a molten to solid state. Furthermore, it continues to expand or "age" with time. A selected sample exhibited a cumulative growth of .0007"/inch over a period between one and one thousand hours after casting.

In filling the cavity 12, it should be taken into account that the cooled mass will occupy a somewhat larger volume than the molten mass. It will be apparent to those skilled in the art and within their skill to control the pouring to insure that the solidified mass will not extend beyond the plane of mouth opening 17. The latter is to be avoided so as to permit proper face-to-face contact of the bodies.

The alloy 18 as mentioned is poured in molten form in cavity 12 and thereafter allowed to cool. If desired, the body 10 may be preheated slightly to prevent a quick chill of the molten alloy when poured in cavity 12 hence insuring uniform investment of all regions of the cavity. A compressible material 19 may then be inserted in the inner reaches of the cavity 16 in body 11 as shown in FIGURE 2, its function being, among other things, to restrict the volume of the cavity 16 appreciably, such as for example, to appreciably less than one-half of that of the alloy 18 filling cavity 12. This compressible material may be of various types including sponge rubber, styrofoam or even balsa wood. Its essential characteristic is that it should be sufficiently compressible to permit the metal alloy filling the remaining portion of cavity 16 to expand in the direction of the inner end of the cavity when it cools.

As seen in FIGURE 2, the first body 10, which is preferably inverted as shown for filling same with the alloy, is then turned over and its mating face 14 placed in contact with the corresponding face 15 of body 11. In supporting body 10 in adjacent contact with body 11 it is preferable that the mouth openings of the respective cavities be placed in juxtaposition, hence the requirement that at least the mouth openings of the cavities be similar in shape and dimension.

With bodies 10 and 11 in contact as shown in FIGURE 2, heat is now applied to the assembly in sufficient quantity to transmit enough heat interiorly of the bodies and into the alloy to remelt same. Heating may be carried out in any convenient manner as for example by placing the unit in a heating oven, exposing the bodies to a naked flame or using electrical resistance heating devices. In connection with the uses of electrical resistance heating, it is possible to support an electrical conductor in cavity 12 of body 10 by means of which a current may be applied to the metal alloy mass for remelting same. This may be advantageously used where the bodies have elongated slots extending from side to side of the bodies. Also, a small tube could be imbedded in the metal alloy and hot water, steam, heated air or other heated fluid could be pumped therethrough to effect remelting of the alloy. When the melting temperature of the alloy (203° F. in the case of Cerro alloy 5250-1) is reached and it becomes fluid, it will flow downwardly so that substantially appreciably less than one-half thereof will invest and fill the remaining volume in cavity 16 (the end faces of both bodies may once again be "dammed' by plates, etc. during the remelting step), the remaining portion of the alloy staying in the cavity 13 of the upper body 10 but displacing downwardly as shown to form a void 20 therein. The purpose of the latter is to provide space to accommodate the expansion of the alloy in cavity 13 upon cooling. If, for example, the respective cavities were completely filled with molten alloy, the alloy upon cooling would have no room to expand and the first body 10 would be forced upwardly in spaced separation from the second body 11.

While the particular cavity shape used may be varied, it is advantageous to form them as complemental dovetails. The advantage of using dovetails is that upon expanding when cooling, the alloy 18 creates forces extending normally to the sides of the dovetails which forces have vector components that act vertically and horizontally to force the bodies into tight contact with each other. In other words, the faces of the dovetails serve as shoulder means facing away from the mouth openings and thus provide anchorages at any point inwardly therefrom.

The fastening together of the bodies 10 and 11 achieved by the present invention is such that no relative movement will occur therebetween at any time and the joint is effected interiorly of the bodies thus providing for a smooth external surface on the connected assembly. The joint is absolutely tight due to the expansion forces created therein by the "non-shrinking" type alloy.

To further enhance the strength of the bond connecting the two bodies together and to minimize the effect of shearing forces acting in the plane of the mating faces of the bodies, a shear element 30 such as that shown in FIGURE 4 may be included in the joint. The shear element 30 which may be in rod, bar or similar form may be of metal although other materials including the parent material of the bodies could also be used. It is preferable that the shear member 30 be supported within the cavity 31 of the upper body 32 as shown in FIGURE 4 before introducing the alloy 33 therein, and the shear member should have sufficient height to extend outwardly of the cavity a distance as shown. The molten alloy is then introduced into the cavity 31 and allowed to cool. The upper body 32 is then inverted and placed in mating face-to-face contact with the other body 34 as shown in FIGURE 5. The cavity 35 in the lower body 34 is also partly filled with compressible material 36. as shown. When the assembly is thereafter heated to cause the alloy to remelt (which occurs at 203° F. in the case of Cerro alloy 5250–1 as the melting temperature of the alloy remains substantially unaffected by remelting), a portion of the alloy 33 will flow downwardly and fill the remaining volume of cavity 35 with the remaining portion thereof partly filling the upper cavity 31. The shear member 30 during remelting, will "float down" or sink from its position contacting the inner end of the dovetail 31 in body 32 and come to rest on top of the compressible material 36. It is preferable that the height of the shear member be such that it will extend an equal distance into both cavities when the joint is formed as shown and will be spaced at the top a short distance below the inner end of the cavity 31. The strength of the joint is substantially increased by the addition thereto of the shear member and it is particularly desirable that it be included in the joint of connected workpieces serving as structural assemblies.

The requirements of the present invention do not mandate that the cavities in the respective bodies extend from side to side of the bodies as shown in FIGS. 1–5 and have particular shapes. For example, the bodies 50 and 51 shown in FIGURES 6 and 7 are intended to be connected together by means of a joint utilizing cavities 52, 52′ and 53, 53′ respectively which are blind in all directions except in the direction of the open mouths thereof. To that end, each body is provided with at least one frusto-conical cavity, the smallest diameter of the cone being located at the respective mating surfaces 54 and 55. Molten alloy 57 is then introduced into the cavities 52, 52′ in the upper body 50, the body being held in an inverted position (not shown) in the same manner as described before and the alloy allowed to cool. The cavities 53, 53′ in the lower body 51 may then be filled partly with compressible sponge rubber 56 in the same manner previously described and the bodies then brought into mating face-to-face contact. The assembly is then subjected to a heating in order to conduct heat to the alloy to remelt same. Upon remelting, the alloy will flow from the cavities 52, 52′ in the upper body from the position shown in the right half of FIGURE 7 downwardly into the free areas of the lower cavities 53, 53′ completely filling same and partly filling the upper body cavity as seen at the left in FIGURE 7. Obviously in heating the assembly in FIGURE 7, the heat would preferably be uniformly applied so that melting would occur in both joint connections simultaneously but for purposes of clarity and illustration only one is shown as having melted.

According to the invention, it is also possible to form a joint by partly filling the cavities in each of the two bodies to be connected together and then heating the bodies so that the alloy in each will melt together to form one mass. Referring to FIGURES 8 and 9, bodies 60 and 70 which are to be connected are provided with the dovetails 61, 71 respectively. Although the bodies are shown in an assembled position, it will be obvious that body 60 should be inverted when partly filling it with molten alloy 62. After the alloy 62 has solidified, the body 60 may be placed on top of body 70 as shown in FIGURE 8. Cavity 71 in body 70 is partly filled with a compressible material 72 at its inner reaches and a molten mass of alloy 73 poured therein, the latter not quite filling the remaining volume in cavity 71. The mass of alloy 73 is allowed to cool and the bodies 60 and 70 placed in contact with their respective cavities in communication. The bodies are thereafter heated so as to remelt the alloy masses 62, 72 which run together or coalesce as shown in FIGURE 9 to form a single mass 80. The compressible material 72 permits inward expansion of the mass 80 in cavity 71 and the void in the inner reaches of cavity 61 allows for inward expansion of the mass 80 in said cavity.

It will be apparent to those skilled in the art that a wide range of metallic alloys may be used in the joint depending upon the particular type of material used for making the bodies being connected. The alloy of course should not have a melting temperature in a range which would result in damage to the surfaces of the cavity or is so high that it would prolong the heating required of the bodies to effect melting, also the alloy should have a melting temperature at least in excess of the ambient temperature range to which the bodies are intended to be subjected in use, and finally the alloy should possess the property of being non-shrinking when changing from a molten to solid state.

When it is desired to separate the two bodies it is only required that they be once again heated up to melt the alloy in the joint and the bodies can then be pulled apart. By applying sufficient heat to the separated bodies, all of the alloy may be melted out of the respective cavities so that the bodies can later be rejoined in the manner set forth hereinbefore.

From the foregoing description it will be apparent that the method of connecting two bodies taught by this invention has a number of advantages. Most notably it permits a blind fastening of the bodies, "hidden," "secret," and "recessed" being synonymous for the type of fastening joint effected by the invention. The fastening is easily effected, it is relatively inexpensive, it is easy to separate the bodies if it is necessary to repair one or the other, it is useful for connecting a wide range of materials together and it does away with expensive machining requirements encountered when connecting bodies of very hard material, i.e., tungsten steel.

While there is disclosed but some embodiments of the method and article of the present invention it is possible to produce still other embodiments without departing from the scope of the inventive concept herein disclosed, and accordingly it should be understood that all matter contained in the above description or shown in the accompanying drawings should be interpreted as illustrative and not in a limiting sense.

What is claimed is:

1. A workpiece assembly comprising first and second bodies arranged in surface-to-surface contact, each body having a cavity therein extending inwardly from an opening in the surface thereof, each cavity enlarging uniformly in size inwardly of said openings, said openings being juxtaposed one with the other, and a mass of a non-shrinking type metal alloy investing and partly filling each of said cavities, said metal alloy having a melting temperature in a range which is below that of said bodies.

2. A workpiece assembly as set forth in claim 1 further comprising a shear member embedded in said mass of metal alloy and extending partly into the cavity in each body.

3. A workpiece assembly comprising first and second bodies arranged in surface-to-surface contact, each body having a cavity therein extending inwardly from a mouth opening in the surface thereof and having a shoulder means therein facing away from the mouth opening defining an anchorage, said mouth openings being juxtaposed, and a mass of a non-shrinking type metal alloy investing and partly filling the anchorage in each cavity, said metal alloy having a melting temperature in a range which is below that of said bodies.

4. A workpiece assembly comprising first and second bodies arranged in surface-to-surface contact, each body having a slotted cavity therein extending partly along said surfaces, each cavity extending inwardly from a mouth opening in said surfaces and having a shoulder means therein facing away from the mouth opening defining an anchorage, said mouth openings being of identical shape and dimension and being juxtaposed, and a mass of a non-shrinking type metal alloy investing and at least partly filling the anchorage in each cavity, said metal alloy having a melting temperature in a range which is below that of said bodies.

5. A workpiece assembly comprising first and second bodies arranged in surface-to-surface contact, each having a cavity therein extending inwardly from a mouth opening in the surface thereof and having a shoulder means therein facing away from the mouth opening defining an anchorage, said mouth openings being juxtaposed, a compressible material partly filling the cavity of one body, and a mass of a metal alloy investing the remainder of the cavity of said one body and partly filling the cavity anchorage in the other body, said metal alloy having a melting temperature in a range which is below that of said bodies and which is non-shrinking during change from a molten to a solidified state.

References Cited
UNITED STATES PATENTS

| | | | |
|---|---|---|---|
| 1,132,902 | 3/1915 | Baver | 29—191.4 |
| 1,605,443 | 11/1926 | Kennedy | 29—191.4 |
| 2,775,030 | 12/1956 | Weiss | 29—191.4 |
| 3,257,177 | 6/1966 | Kanter | 29—191.4 |

DAVID L. RECK, *Primary Examiner.*

RICHARD O. DEAN, *Examiner.*